United States Patent
Tilt

[19]
[11] Patent Number: 6,029,194
[45] Date of Patent: Feb. 22, 2000

[54] AUDIO/VIDEO MEDIA SERVER FOR DISTRIBUTED EDITING OVER NETWORKS

[75] Inventor: Christopher E. Tilt, Portland, Oreg.

[73] Assignee: Tektronix, Inc., Wilsonville, Oreg.

[21] Appl. No.: 08/872,032

[22] Filed: Jun. 10, 1997

[51] Int. Cl.[7] ............................... H04N 7/14; H04H 1/02
[52] U.S. Cl. ............................... 709/219; 348/12; 348/13; 455/5.1
[58] Field of Search .................................... 345/326, 327, 345/328; 395/200.47–200.49; 348/7, 12, 13, 10, 6; 455/3.1, 4.1, 4.2, 5.1, 6.1, 6.2; 709/217–219

[56] References Cited

U.S. PATENT DOCUMENTS

| | | |
|---|---|---|
| 5,781,730 | 7/1998 | Reimer et al. . |
| 5,815,146 | 9/1998 | Youden et al. .............................. 348/7 |
| 5,892,915 | 4/1999 | Duso et al. . |

*Primary Examiner*—John W. Miller
*Attorney, Agent, or Firm*—Francis I. Gray

[57] ABSTRACT

An audio/video media server for distributed editing over networks receives requests from clients on the networks that include a clip identifier, a delivery destination identifier and the frame numbers from the clip desired. The media server parses the requests and asynchronously accesses a file system to retrieve the requested media frames from a storage medium. The retrieved media frames are asynchronously transferred to a FIFO buffer, and a clock rate for a local clock is adjusted according to the fullness of the buffer. The media frames from the buffer are sent in the form of data packets over the networks in response to interrupts generated by the local clock. In this manner the timing for the media frames is controlled by the clients to assure a continuous stream of video during editing.

5 Claims, 3 Drawing Sheets cid = CLIP ID
did = DELIVERY INDENTIFIER
hid = cid + did
F# = FRAME NUMBER
    RANGE 1.....N

AUDIO/VIDEO MEDIA SERVER FOR DISTRIBUTED EDITING OVER NETWORKS

STATEMENT REGARDING FEDERALLY SPONSORED RESEARCH OR DEVELOPMENT

This invention was developed under a federally sponsored research project, and the United States Government has certain rights as specified in the United States Department of Commerce Contract Number 70NANB5H1176.

CROSS-REFERENCE TO RELATED APPLICATIONS

Not applicable

BACKGROUND OF THE INVENTION

The present invention relates to the distribution of packetized data over networks, and more particularly to an audio/video media server for distributed editing over networks using a low-resolution format or a high-resolution format, depending upon the available network bandwidth.

Existing media servers stream video and audio packets over a network under control of a server. A client consumes video at whatever rate the server sends the packets—the client consumes a contiguous movie. In other words the current media servers "push" media from the server to the client using a "stream" from the server. These servers are often called "video on demand" servers, however they refer to the delivery of contiguous movies, not in-progress material suitable for an edit session.

In an editing environment a client is looking to put together a "movie" from a plurality of video clips that may be distributed over a plurality of servers. With the "video on demand" servers the timing of the video to the client is determined by the servers. To provide concatenated clips, especially when a first clip is from one server and a second clip is from another server, the timing issue is "when does the second server start to 'push' the second clip?" This presents a very complex timing problem.

What is desired is an audio/video media server for distributed editing over a network that allows clients to access media from many distributed servers or even different media files on a server to enable the playing of "edited" movies with the timing controlled by the client.

BRIEF SUMMARY OF THE INVENTION

Accordingly the present invention provides an audio/video media server for distributed editing over a network by responding in an asynchronous manner to media frame requests from one or more clients. Each request contains a clip identifier, a delivery destination and the frames desired from the clip. The media server asynchronously accesses a file system to retrieve the media frames from a storage medium. The media frames are then asynchronously input to a FIFO buffer and a clock rate is adjusted based upon the "fullness" of the FIFO buffer. For each interrupt generated by the clock a media frame is transferred from the buffer, packetized and sent over the network to the requesting client. In this way the client controls the timing of the media frames it receives to assure a continuous stream of media frames during editing.

The objects, advantages and other novel features of the present invention are apparent from the following detailed description when read in conjunction with the appended claims and attached drawing.

DETAILED DESCRIPTION OF THE INVENTION

Figure 1:
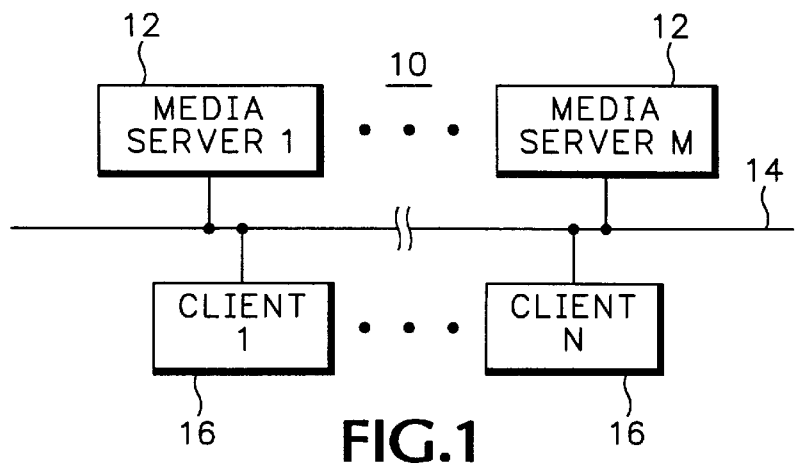
FIG. 1 is a general block diagram view of a distributed network for media editing according to the present invention.

Referring now to FIG. 1 a distributed editing system 10 has a plurality of servers 12, such as Silicon Graphics, Inc. workstation, coupled over a network 14, such as Ethernet, to a plurality of clients 16, such as a personal computer having a Windows NT operating system with a Sigma Designs MPEG decoder. One or more of the clients 16 may access any one of the servers 12 at any time, and even access the same server simultaneously.

Figure 2:
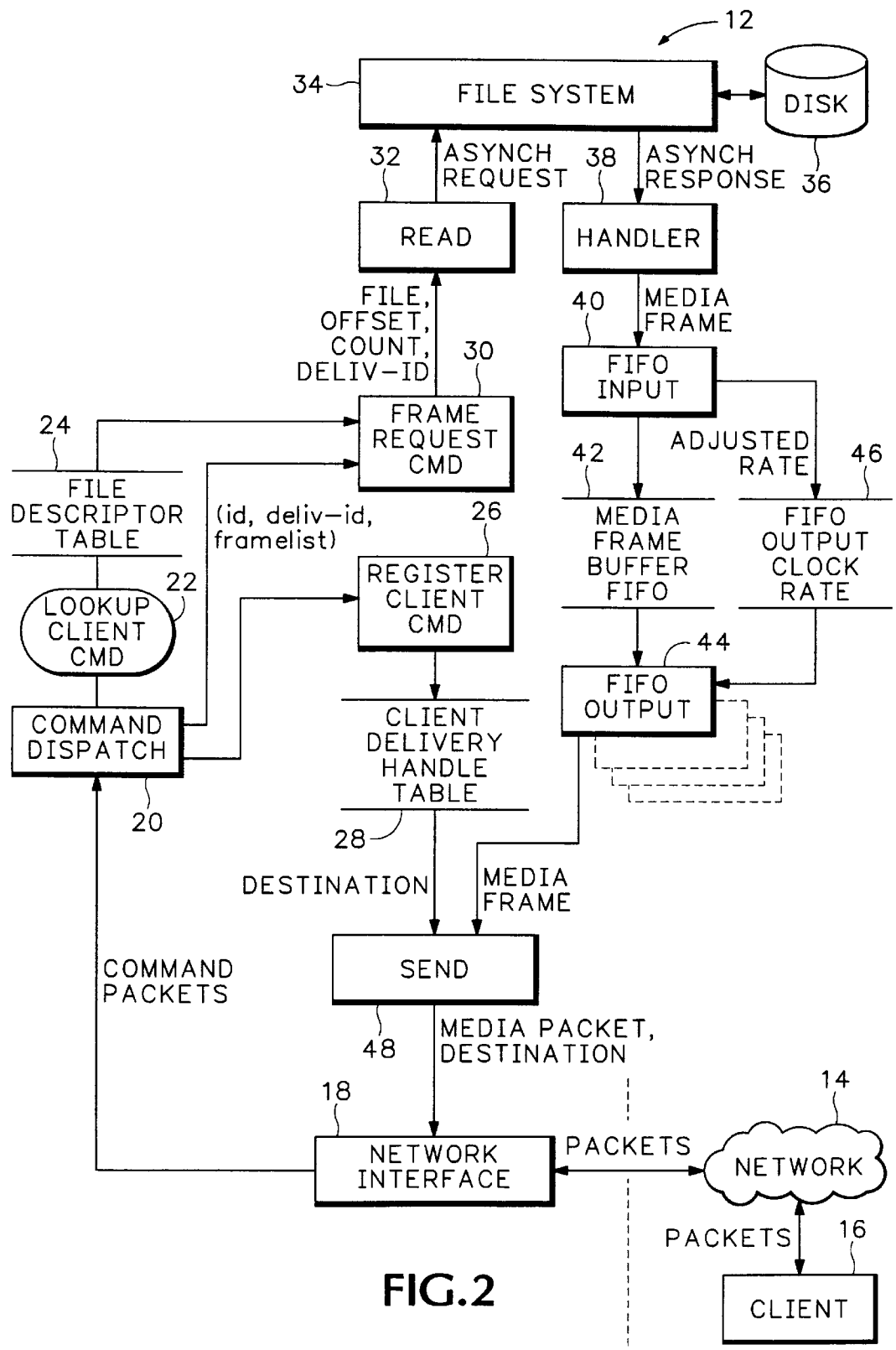
FIG. 2 is a block diagram view of a media server for distributed editing over a network according to the present invention.

One of the clients 16 requests media frames from one of the servers 12 via the network 14. The client requests are in the form of command packets. As shown in FIG. 2 a network interface 18 in the server 12 receives the command packets and routes them to a command dispatcher 20. The command dispatcher 20 routes the command packets to an appropriate processing module depending upon what command is included within the packet. Commands may include "Lookup" commands, "Register" commands or "Request" commands.

A "Lookup" command from the client 16 is a search for a particular file or video clip by the client. The command dispatch module 20 in the server 12 forwards the command to a Lookup command module 22. The Lookup command module 22 returns an "id" to the client 16 for later use in accessing the clip via a file descriptor table 24. If the clip is already "open" as a result of a prior Lookup command, the "id" is simply returned to the client 16. This provides information to the client 16 about where clips are that it might want to access in performing an edit.

A "Register" command from the client 16 is forwarded by the Command Dispatch module 20 to a Register Client command module 26. The Register Client command module 26 accesses a Client Delivery Handle table 28 and returns a destination identifier "did" to the client 16. In this manner the server 12 may keep track of what clients 16 have accessed it and the clients may use the "did" in subsequent requests to notify the server where to deliver media frames.

Once the client 16 has located the desired clips via the Lookup command and registered with the server 12 with the Register command, the client now makes requests for media frames using the Request command. The Request command includes the clip "id", the "did" and a "framelist" that includes the frames desired in response to the request. The Command Dispatch module 20 routes the Request command to a Frame Request module 30. The Frame Request module 30 converts the "id" and "framelist" together with the file descriptor information from the File Descriptor table 24 into a file address, an offset from the start of the file, a count corresponding to the number of frames requested and the delivery identification. Each media frame in the framelist is treated individually at this point.

A Read module 32 receives the information from the Frame Request module 30 and asynchronously accesses a file system 34 that retrieves the requested media frames one at a time from a storage unit 36, such as disk. A Handler module 38 then asynchronously receives the media frames one at a time from the file system 34 and provides the retrieved frame to a FIFO Input module 40. The FIFO Input module 40 stores each frame as received into a media frame first-in/first-out (FIFO) buffer 42 and also, either before or after storing each frame in the FIFO, checks the "fullness" of the FIFO. Based upon the "fullness" the FIFO Input module 40 provides an adjusted clock rate signal to a FIFO output clock 46. In this manner the data flow from the media server 12 is smoothed out. The FIFO output clock provides a periodic interrupt to a FIFO Output module 44 which extracts a media frame from the FIFO 42 for transmission to the requesting client 16. A Send module 48 receives the media frame from the FIFO Output module 44 and a destination address from the Client Delivery Handle table 28 and produces a media packet which is sent via the network interface 18 over the network 14 to the requesting client 16.

Figure 3:
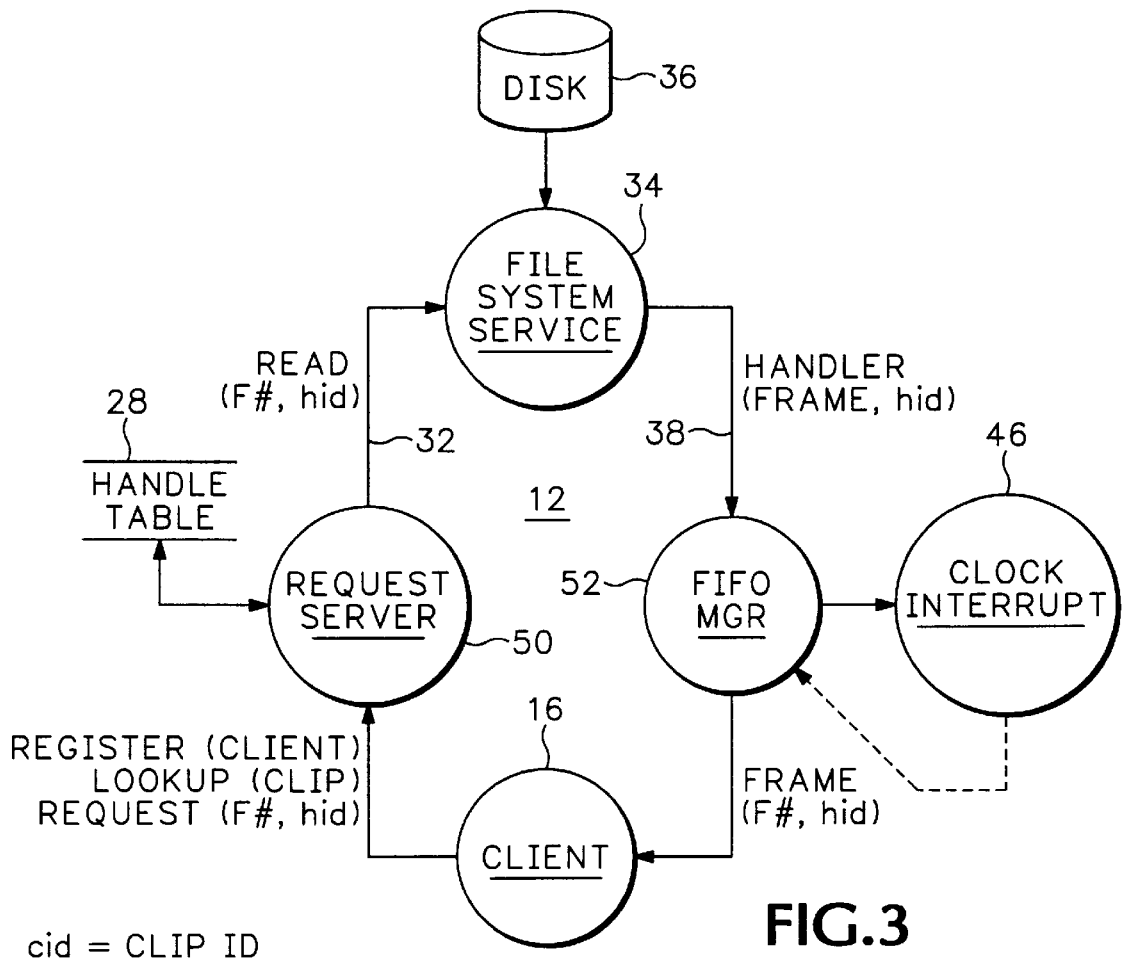
FIG. 3 is a message flow chart for the media server according to the present invention.
Figure 4:
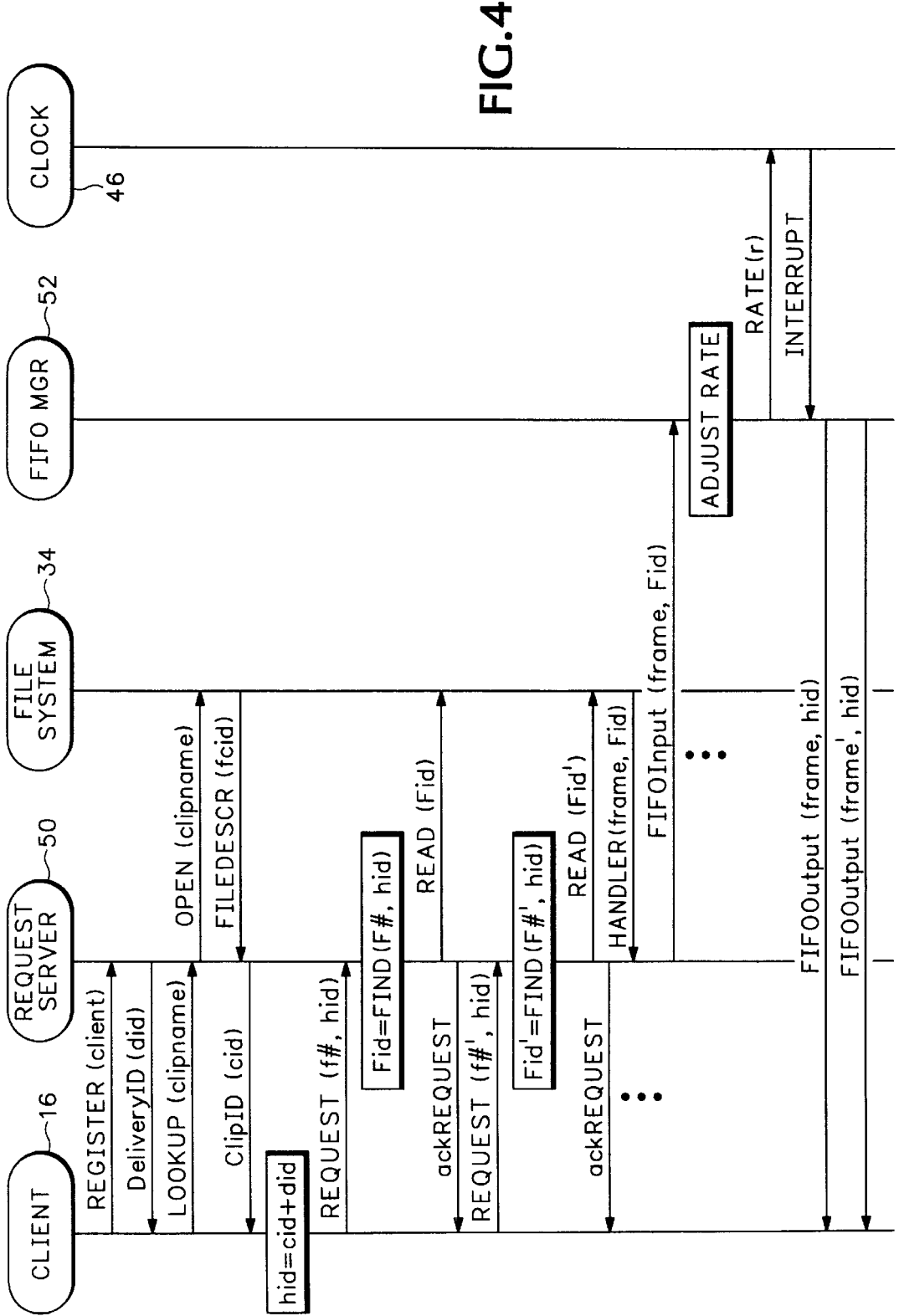
FIG. 4 is a message sequence chart for the operation of the media server according to the present invention.

Referring now to FIGS. 3 and 4 the message flow is in the form of commands (REGISTER, LOOKUP and REQUEST) from the client 16 to a request server 50 within the media server 12. The request server 50 processes the REGISTER, LOOKUP and REQUEST commands, as indicated above, to provide a delivery identification for the client in the Handle table 28 and establish a clip identification and to provide frame read requests for the file system 34. In response to the asynchronous read requests the file system 34 retrieves files from the disk 36, and in response to handler requests the retrieved files on a frame by frame basis are transferred to a FIFO Manager 52. The FIFO Manager 52 provides rate adjustment for the clock 46, stores the frames as retrieved from the file system 34, and outputs the frame packets to the client 16 in response to the clock interrupts.

A typical message sequence would start with a REGISTER command from the client 16, which binds a network address and path to the client. The request server 50 returns to the client 16 the destination identifier ("did"). The client 16 then provides a LOOKUP command for a particular clip. The request server 50 asks the file system 34 to open the clip, if not already open, and the file system returns to the request server a file descriptor identifier. The request server 50 then returns the clip identifier ("id") to the client 16. The client 16 now has the information it needs to make media frame requests in the form of REQUEST commands to the request server 50 that include the clip identifier and delivery identifier as a hybrid identifier ("hid") and the number of frames from the clip desired—generally from three to ten frames per REQUEST command. The request server 50 sends a read request to the file system 34 and acknowledges the client's request. Upon receipt of the acknowledgement the client 16 may send another REQUEST command to the request server 50 for the next group of frames from the clip. Again the request server 50 forwards a read request to the file system 34 and acknowledges the request from the client.

The Handler module 38 returns the requested frame to the request server 50 which then forwards the frame information to the FIFO Manager 52. The FIFO Manager 52 provides a rate command to the clock 46 which returns interrupts to the FIFO Manager. The FIFO Manager 52 in response to the interrupts outputs to the client 16 frame packets for each requested frame.

For multiple clients 16 simultaneously accessing a single media server 12 the media frames from the FIFO 42 may be read out by separate FIFO output modules 44 for each client. To avoid "starving" any one client 16 the FIFO output modules 44 are accessed in a rotational manner so that packets for each client are sent to the network 14 in an intermingled fashion, thus preventing the server 12 from being "captured" by a single client when multiple clients are accessing it.

Thus the present invention provides a media server that leaves timing to requesting clients by processing request commands from clients on a demand basis, and asynchronously accessing the requested media files and returning them to the client at a sufficient rate so that the client has a steady stream of video images to process, regardless of where the clips are coming from.

What is claimed is:

1. A method of distributed editing of video clips over a network having a plurality of clients and at least one media server comprising the steps of:

requesting from one of the clients over the network a portion of a video clip from the media server, each portion containing at least one media frame;

asynchronously accessing a file system to retrieve the requested portion of the video clip from a storage medium;

asynchronously transferring the portion from the file system to a buffer one media frame at a time; and transmitting the media frame in the form of network packets from the media server to the requesting client over the network as a function of a local clock rate.

2. The method as recited in claim 1 further comprising the step of adjusting the clock rate as a function of a current capacity of the buffer to even out the rate of transmitting the media frames.

3. The method as recited in claim 1 wherein the transmitting step comprises the step of transmitting in a cyclical manner the media frames in the buffer for different clients so that no client is starved for media frames.

4. The method as recited in claim 1 further comprising the step of registering the client with the media server to determine a delivery identification for the client for the media server, which delivery identification is provided by the client as part of the requesting step.

5. The method as recited in claim 1 further comprising the step of looking up a desired clip by the client in the media server to provide the client with a clip identification, which clip identification is provided by the client as part of the requesting step.

* * * * *